US012581085B2

(12) United States Patent
Gao et al.

(10) Patent No.: US 12,581,085 B2
(45) Date of Patent: Mar. 17, 2026

(54) CCSO WITH FILTER SHAPES

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 37 days.

(21) Appl. No.: 18/804,963

(22) Filed: Aug. 14, 2024

(65) Prior Publication Data

US 2025/0350729 A1 Nov. 13, 2025

Related U.S. Application Data

(60) Provisional application No. 63/646,452, filed on May 13, 2024.

(51) Int. Cl.
| | |
|---|---|
| *H04N 19/132* | (2014.01) |
| *H04N 19/172* | (2014.01) |
| *H04N 19/186* | (2014.01) |
| *H04N 19/70* | (2014.01) |

(52) U.S. Cl.
CPC ......... *H04N 19/132* (2014.11); *H04N 19/172* (2014.11); *H04N 19/186* (2014.11); *H04N 19/70* (2014.11)

(58) Field of Classification Search
CPC .................................................. H04N 19/132
See application file for complete search history.

(56) References Cited

U.S. PATENT DOCUMENTS

2022/0109860 A1* 4/2022 Chen ...................... H04N 19/82

* cited by examiner

*Primary Examiner* — Jerry T Jean Baptiste
(74) *Attorney, Agent, or Firm* — Morgan, Lewis & Bockius LLP

(57) ABSTRACT

Various implementations described herein include methods and systems for coding video. In one aspect, a video bitstream includes a current image frame, a first syntax element for a cross-component sample offset (CCSO) mode, and a second syntax element for defining a filter shape of a loop filter applied in the CCSO mode. When the first syntax element indicates that CCSO mode is enabled, a set of luma samples are identified based on the second syntax element and include a first luma sample collocated with a first color sample and a plurality of neighboring luma samples of the first luma sample. The loop filter is applied to combine the set of luma samples to generate a first sample offset of a first color sample of a first color component. The current image frame is reconstructed at least by adjusting the first color sample based on the first sample offset.

24 Claims, 9 Drawing Sheets

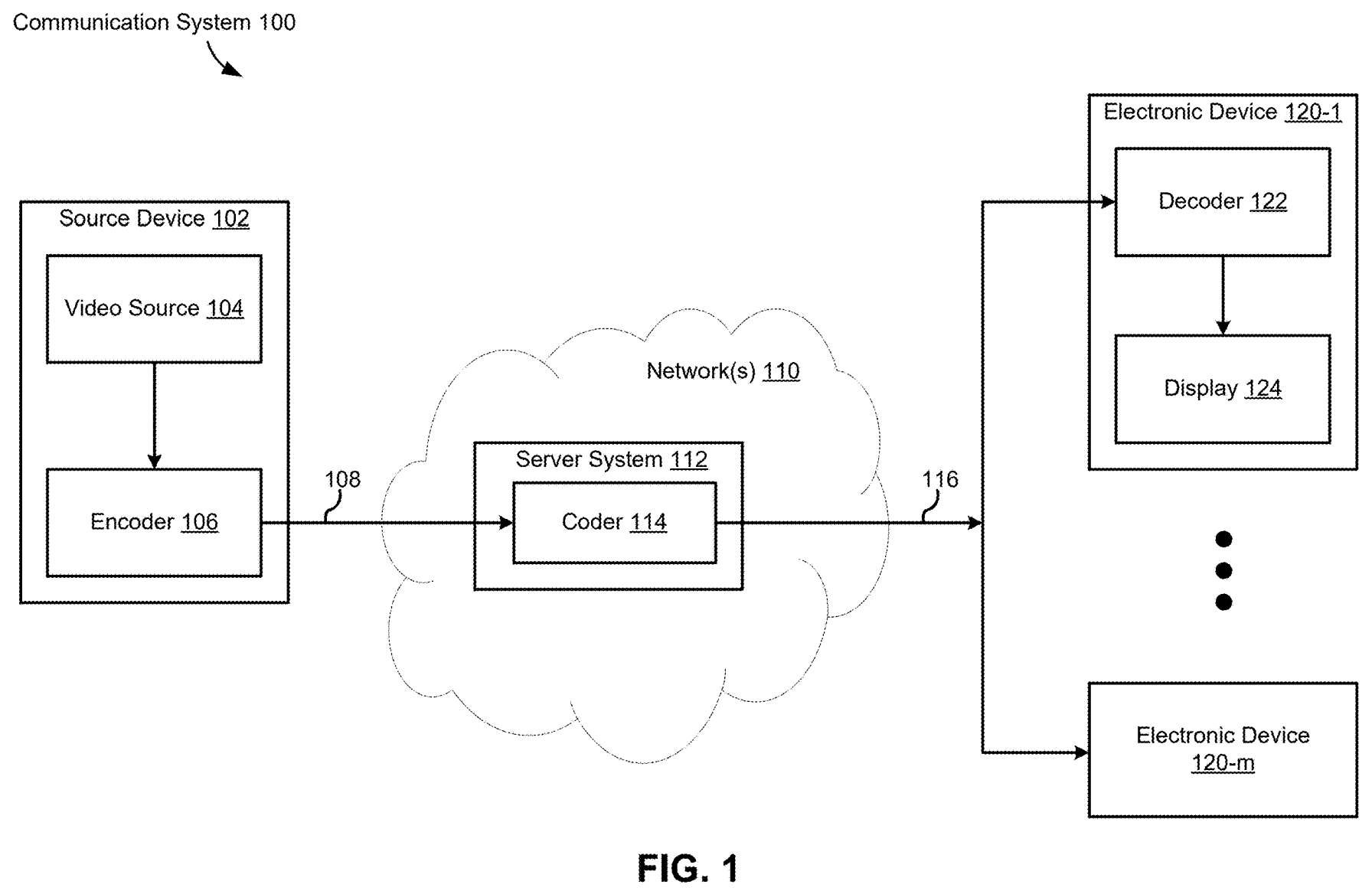

Communication System 100

Source Device 102
Video Source 104
Encoder 106

108

Network(s) 110

Server System 112
Coder 114

116

Electronic Device 120-1
Decoder 122
Display 124

Electronic Device 120-m

FIG. 1

Server System
112

Memory 314

Operating System 316

Network Communication Module 318

Coding Module 320

Decoding Module 322

Parsing Module 324

Transform Module 326

Prediction Module 328

Filter Module 330

Encoding Module 340

Code Module 342

Prediction Module 344

Picture Memory 352

Control
Circuitry 302

312

User Interface 306

Output
Device(s) 308

Input
Device(s) 310

Network
Interface(s)
304

CCSO WITH FILTER SHAPES

RELATED APPLICATIONS

This application claims priority to U.S. Provisional Patent Application No. 63/646,452, entitled "CCSO with Filter Shapes," filed May 13, 2024, which is hereby incorporated by reference in its entirety.

TECHNICAL FIELD

The disclosed embodiments relate generally to video coding, including but not limited to systems and methods for loop filtering (e.g., cross-component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Examples of the first color component is a luma color component, and examples of the second color component is a chroma color component. In some implementations, the first color component and the second color component correspond to the same color component, e.g., luma sample.

In various embodiments of this application, samples of a first color component are processed by a cross-component offset filter in loop filtering to determine an offset value that is added on a sample of a second color component. Cross-component offset filtering is implemented based on a loop filter that using reconstructed color samples to determine the sample offsets of luma and/or chroma components. For example, a sample offset is determined based on luma values of a first luma sample and one or more neighboring luma samples. In some embodiments, the sample offset is determined based on edge offsetting corresponding to gradients between the first luma sample and associated neighboring luma sample(s). Alternatively, in some embodiments, the sample offset is determined based on band offsetting corresponding to the luma values (not the gradients) of the first luma sample and associated neighboring luma sample(s).

In accordance with some embodiments, a method of video decoding is provided. The method includes receiving a video bitstream including a current image frame, a first syntax element for a cross-component sample offset (CCSO) mode indicating whether to generate a first sample offset of a first color sample of the current image frame based on one or more luma samples, and a second syntax element for defining a filter shape of a loop filter applied in the CCSO mode. The method further includes, when the first syntax element indicates that CCSO mode is enabled, based on the second syntax element, identifying a set of luma samples including a first luma sample collocated with the first color sample and a plurality of neighboring luma samples of the first luma sample. The method further includes applying the loop filter to combine the set of luma samples to generate the first sample offset of the first color sample and reconstructing the current image frame at least by adjusting the first color sample based on the first sample offset.

In accordance with some embodiments, a method of video encoding is provided. The method includes receiving video data comprising a current image frame, encoding the current image frame, transmitting the encoded current image frame via a video bitstream, signaling, via the video bitstream, a first syntax element for a cross-component sample offset (CCSO) mode indicating whether to generate a first sample offset of a first color sample of the current image frame based on one or more luma samples, and signaling, via the video bitstream, a second syntax element for defining a filter shape of a loop filter applied in the CCSO mode. When the first syntax element indicates that CCSO mode is enabled, the second syntax element is applied to identify a first luma sample collocated with the first color sample and a plurality of neighboring luma samples of the first luma sample for determining a first sample offset of a first color sample of a first color component.

In accordance with some embodiments, a method of bitstream conversion is provided. The method includes obtaining a source video sequence including a current image frame and performing a conversion between the source video sequence and a video bitstream. The video bitstream includes the current image frame, a first syntax element for a CCSO mode indicating whether to generate a first sample offset of a first color sample of the current image frame based on one or more luma samples, and a second syntax element for defining a filter shape of a loop filter applied in the CCSO mode. When the first syntax element indicates that CCSO mode is enabled, the second syntax element is applied to identify a first luma sample collocated with the first color sample and a plurality of neighboring luma samples of the first luma sample for determining a first sample offset of a first color sample of a first color component.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
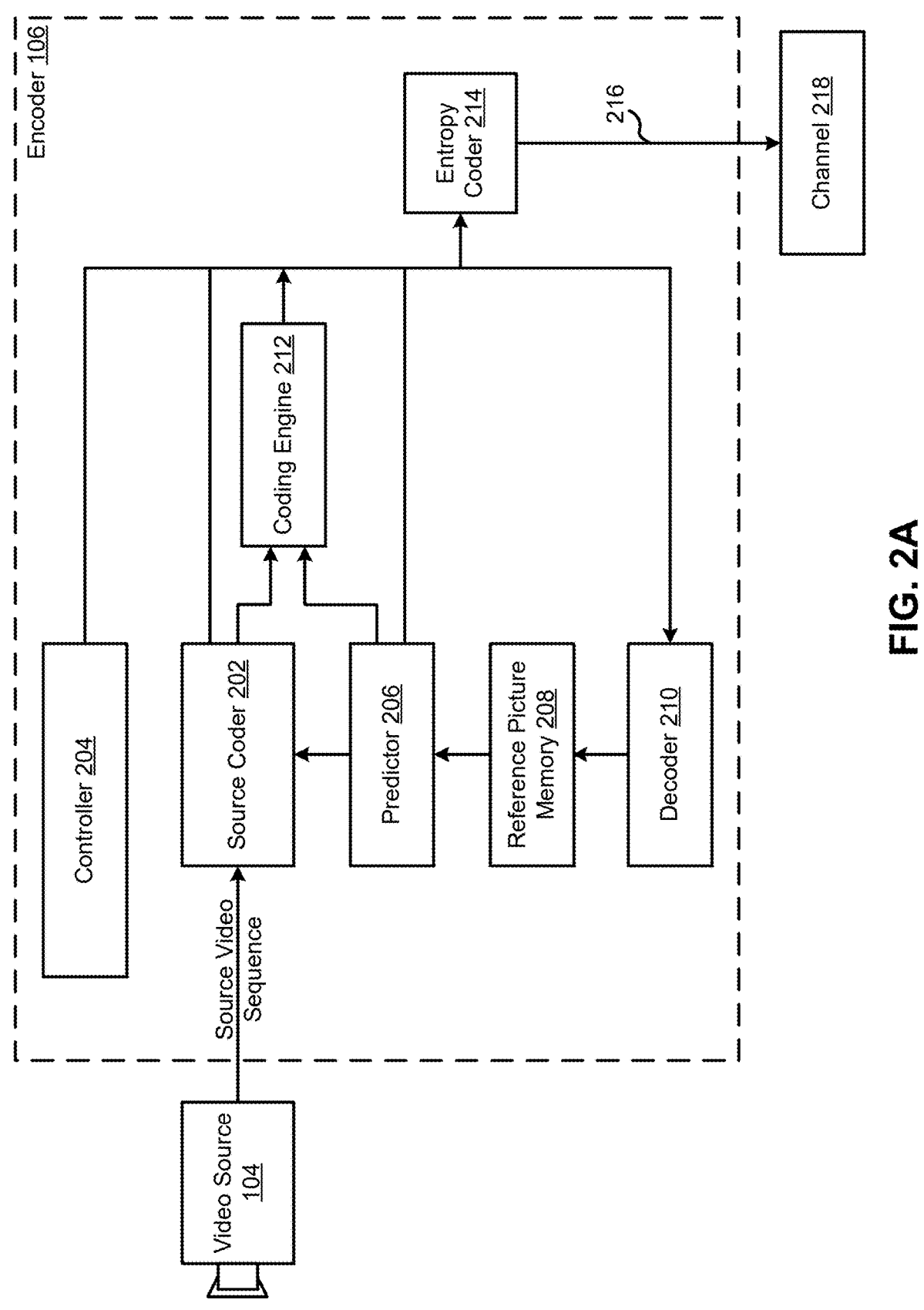
FIG. 2A is a block diagram illustrating example elements of an encoder component in accordance with some embodiments.

The present disclosure describes methods, systems, and non-transitory computer-readable storage media for applying a loop filter for video (image) compression. In-loop filtering technologies are applied to adjust reconstructed picture samples to further reduce a reconstruction error. A cross-component offset filtering method is implemented to apply a collocated reconstructed sample and associated neighboring reconstructed samples of a first color component to derive an offset value that is added on a current sample of a second color component, thereby adjusting a reconstruction value of the current sample. In various embodiments of this application, a decoder receives a video bitstream from an encoder including a current image frame, a first syntax element indicating whether a first sample offset of a first color sample is determined based on values of one or more luma samples, and a second syntax element for defining a filter shape of a loop filter applied in the CCSO mode. Sample values of a first color component are used in cross-component offset filtering to determine an offset value that is added on a sample of a second color component. For example, luma samples are applied to generate an offset value of a first luma sample or a first chroma sample that is collocated with the first luma sample.

More specifically, in some embodiments, a video decoder identifies a set of luma samples including a first luma sample and a plurality of neighboring luma samples of the first luma sample, e.g., based on a filter shape defined by the second syntax element. In some embodiments, the decoder determine difference values between the neighboring luma sample(s) and the first luma sample. The difference values are quantized, e.g., using a scalar quantizer, to generate one or more quantized values. Alternatively, in some embodiments, the decoder does not determine difference values between the neighboring luma sample(s) and the first luma sample. The luma samples are quantized, e.g., using a scalar quantizer, to generate one or more quantized values without involving any difference values associated with the luma samples. Further, the scalar quantizer may be specified by quantization intervals (e.g., ranges of values assigned to the same integer) and quantization levels (e.g., integer values to which a quantization interval is assigned). A first color sample is classified, e.g., by a classifier, based on the one or more quantized values to determine a first sample offset of the first color sample. The first color sample is adjusted based on the first sample offset of the first color sample, thereby enabling reconstruction of the current image frame.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
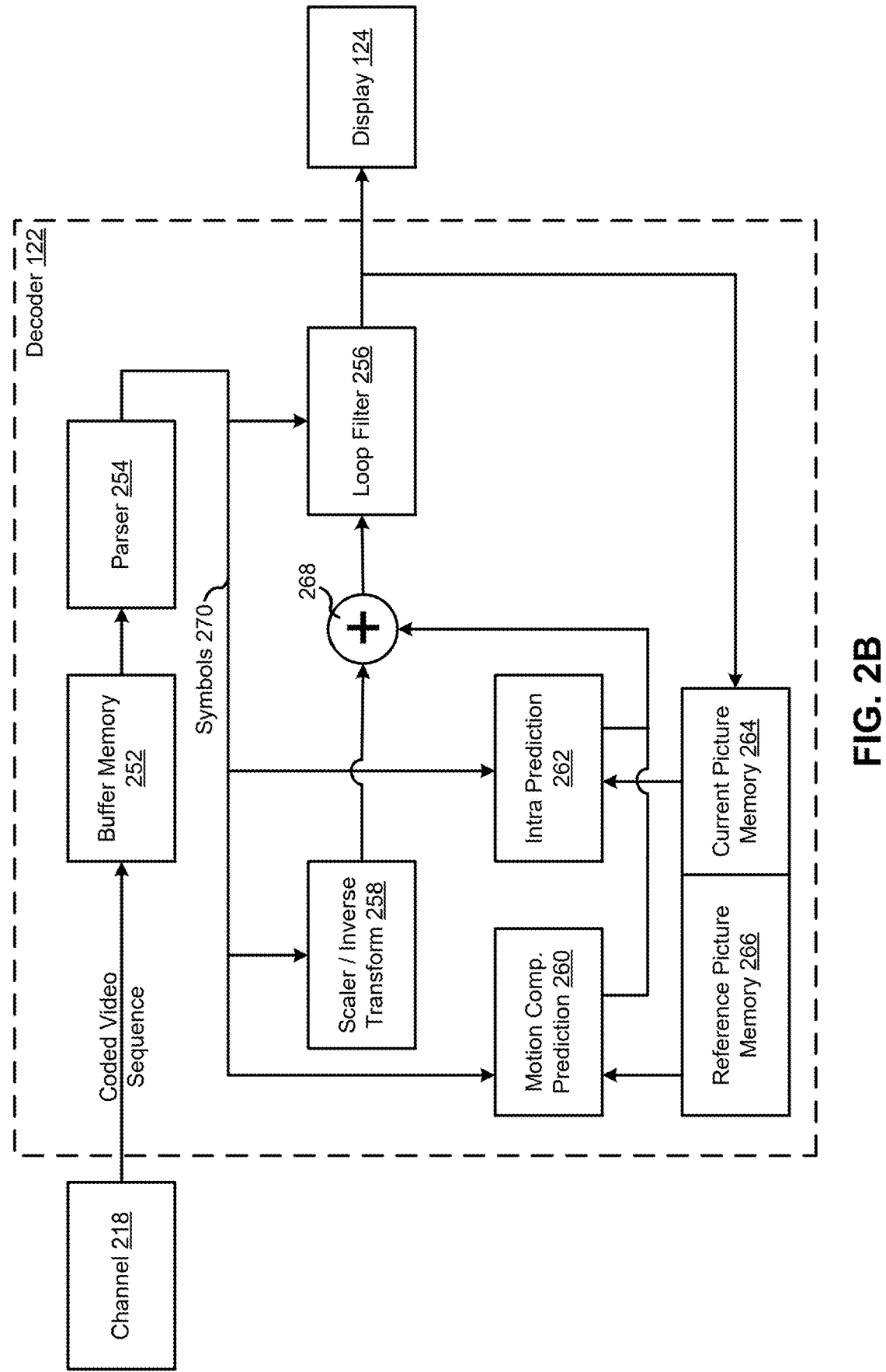
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the sub-group control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
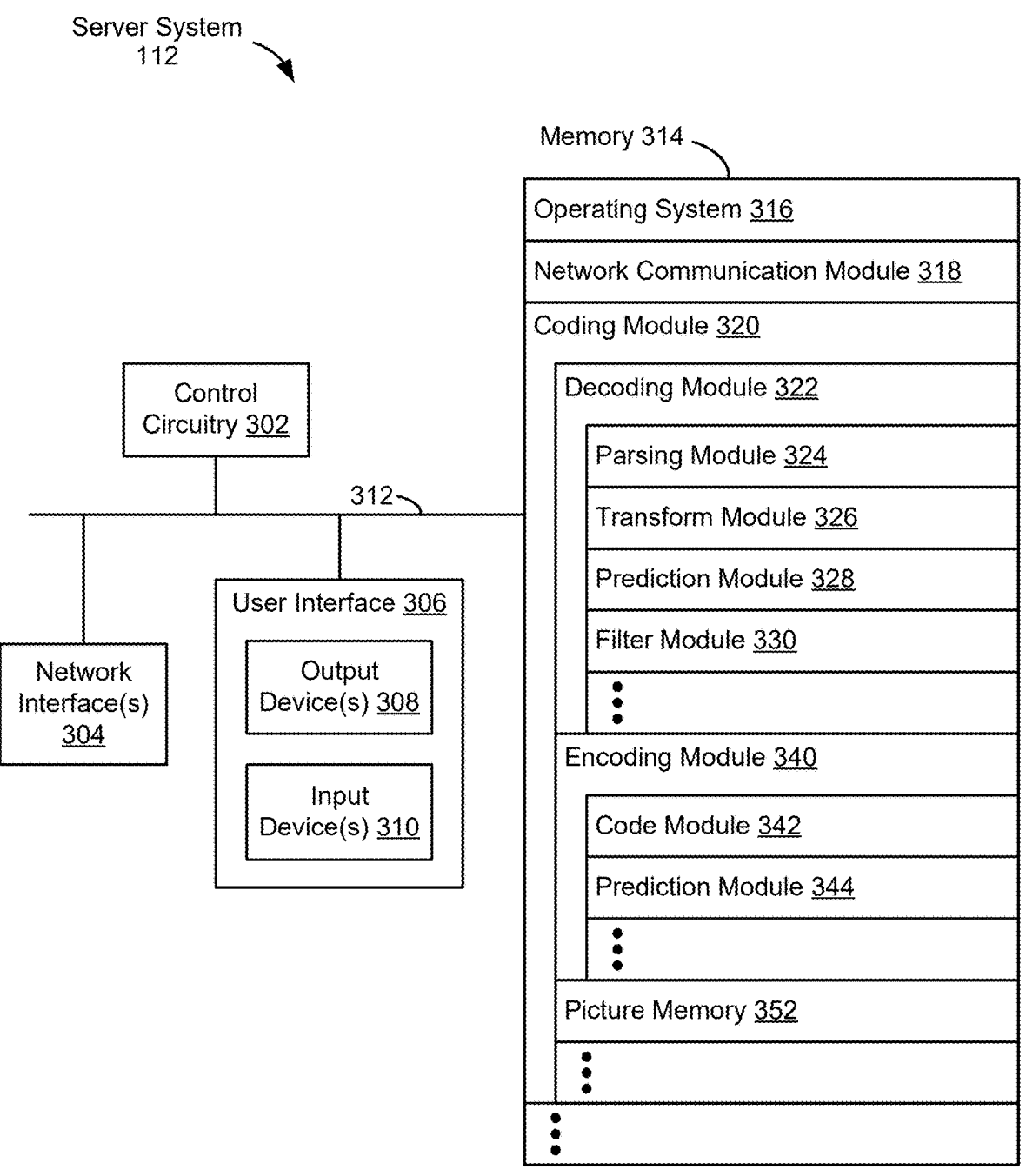
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
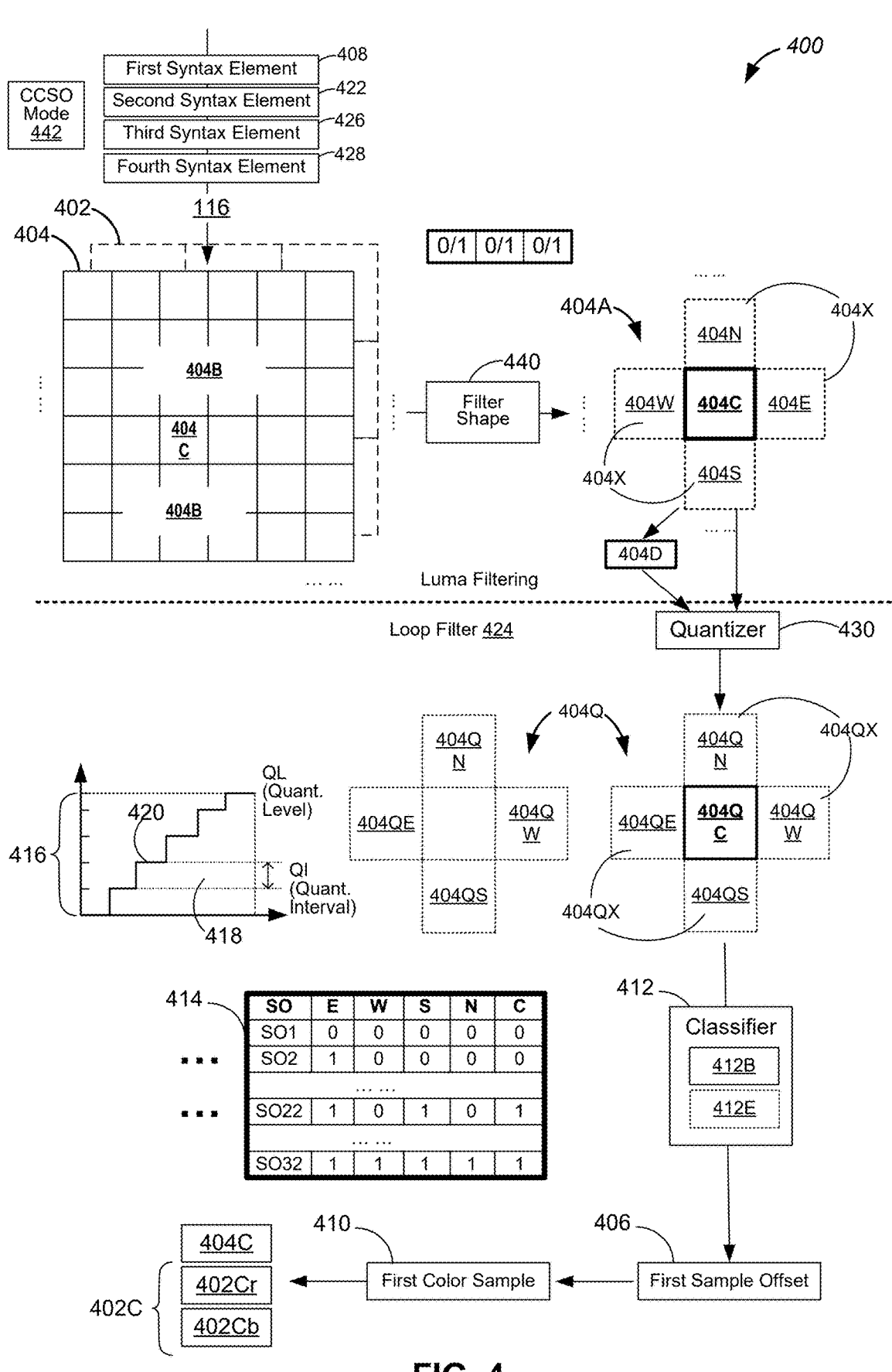
FIG. 4 is a flow diagram of an example process of applying loop filtering in a CCSO mode based on a filter shape, in accordance with some embodiments.

FIG. 4 is a flow diagram of an example process 400 of applying in-loop filtering based on a filter shape 440, in accordance with some embodiments. A GOP includes a sequence of image frames that further includes a current image frame. The current image frame includes a color image, i.e., a non-monochrome image frame, which has a plurality of color samples (e.g., chroma samples 402 and luma samples 404) co-located with one another. After the plurality of color samples of the current image frame are reconstructed, in-loop filtering is applied to adjust a subset of color samples, thereby improving an image quality of the current image frame. In some embodiments, a reconstructed sample and its neighboring reconstructed samples of a first color component are combined to derive an offset value for a second color component. A reconstructed sample of the second color component is co-located with the reconstructed sample of the first color component and adjusted by the offset value. The first color component is optionally identical to or distinct from the second color component. Particularly, in some embodiments, the neighboring reconstructed samples of the first color component are selected based on a filter shape 440 and combined for in-loop filtering to derive the offset value for the second color component (e.g., luma samples 404, chroma samples 402).

In some embodiments, a video bitstream 116 signals a current image frame, a first syntax element 408 for a CCSO mode 442, and a second syntax element 422 for defining a filter shape 440 of a loop filter 424 applied in the CCSO mode 442. The first syntax element 408 indicates whether to generate a first sample offset 406 of a first color sample 410 of the current image frame based on one or more luma samples 402. In some embodiments, the first syntax element 408 has a first predefined value indicating that the CCSO mode 442 is enabled. In some embodiments, the second syntax element 422 is signaled in one of: a sequence header, a picture header, a subpicture header, a slice header, a tile header, and a superblock header.

A decoder 122 receives the video bitstream 116 from an encoder 106. When the first syntax element 408 indicates that CCSO mode 442 is enabled, the decoder 122 identifies a set of luma samples 404A based on the second syntax element 422. The set of luma samples include a first luma sample 404C collocated with the first color sample 410 and a plurality of neighboring luma samples 404X of the first luma sample 404C. The loop filter 424 is applied to combine the set of luma samples 404A to generate the first sample offset 406 of the first color sample 410. The decoder 122 reconstructs the current image frame at least by adjusting the first color sample 410 based on the first sample offset 406.

In some embodiments associated with band offset classification, the CCSO mode 442 corresponds to a band offset classifier 412B. Based on the band offset classifier 412B, the decoder 122 determines that a set of luma samples 404 includes a first luma sample 404C and one or more neighboring luma samples 404X. The set of luma samples 404 are provided to a quantizer 430, and used to generate one or more quantized values 404Q, which are further applied by the band offset classifier 412B to classify the first color sample 410. For example, the filter shape 440 has a cross shape, and the set of neighboring luma samples 404A include the first luma sample 404C, a north luma sample 404N, a south luma sample 404S, a west luma sample 404W, and an east luma sample 404E. These luma samples 404 are further quantized to quantized values 404QC, 404QN, 404QS, 404QW, and 404QE, respectively.

Alternatively, in some embodiments associated with edge offset classification, the CCSO mode 442 corresponds to an edge offset classifier 412E. Based on the edge offset classifier 412E, the decoder 122 determines that a set of luma samples 404 includes a first luma sample 404C and one or more neighboring luma samples 404X. Difference values of the neighboring luma samples 404X and the first luma sample 404C are provided to a quantizer 430, and used to generate one or more quantized values 404Q, which are further applied by the band offset classifier 412B to classify the first color sample 410. For example, the filter shape 440 has a cross shape, and four difference values 404D corresponding to the luma sample 404N, 404S, 404W, and 404E are further quantized to the quantized values 404QN, 404QS, 404QW, and 404QE, respectively.

The first color sample 410 is classified, e.g., by a classifier 412, based on the quantized values 404Q to determine the first sample offset 406 of the first color sample 410. In an example, the quantized values 404Q. A lookup table 414 maps a plurality of combinations of the quantized values 404Q to different sample offset options SO (e.g., SO1-SQ16). Based on the lookup table 414, the quantized values 404Q correspond to one of the combinations in the lookup table 414, and a corresponding sample offset option SO is identified to correspond to a combination of the quantized difference values 404Q and therefore selected for the first sample offset 406. In other words, in some embodiments, the decoder 122 classifies the first color sample 410 by identifying a combination of the one or more quantized values 404Q in a lookup table 414 associating a plurality of quantized combinations with a plurality of offset value options SO (e.g., SO1-SO16) and determining the first sample offset 406 corresponding to the combination of the one or more quantized values 404Q in the lookup table 414.

In some embodiments, values of luma sample(s) 404A are quantized to a plurality of integer values in a quantization range 416 using a scalar quantizer 430 including a plurality of quantization intervals 418 (QI) and a plurality of quantization levels 420 (QL), and each of the one or more quantized values 404Q includes a respective integer in the quantization range 416. For each integer value in the quantization range 416, a quantization interval 418 is defined to be a range of values assigned to the respective integer value. A quantization level 420 corresponds to the respective integer value to which the range of difference values associated with the quantization interval 418 are assigned.

The first color sample 410 is adjusted based on the first sample offset 406 of the first color sample 410, thereby enabling reconstruction of the current image frame. In some embodiments, the first color sample 410 includes a first chroma sample 402C that is co-located with the first luma sample 404C in the current image frame, and the first chroma sample 402C is adjusted based on the first sample offset 406. Alternatively, in some embodiments, the first color sample 410 is the first luma sample 404C, and the first luma sample 404C is adjusted based on the first sample offset 406. Stated another way, in some embodiments, the first color sample 410 is one of: the first luma sample 404C, a first blue-difference chroma (Cb) sample 402Cr, and a first blue-difference chroma (Cb) sample 402Cb. The first luma sample 404C, the first Cb sample 402Cb, and the first Cr sample 402Cr are collocated with one another.

In some embodiments, the plurality of neighboring luma samples 404X applied by the loop filter 424 are selected from a set of candidate luma samples 404B. The plurality of neighboring luma samples 404X includes a subset of first neighboring luma samples (e.g. 404N and 404E) and a subset of second neighboring luma samples (e.g., 404W and 404S). Each first neighboring luma sample is uniquely associated with a respective second neighboring luma sample. For each first neighboring luma sample, a respective position of the first neighboring luma sample and a respective position of the respective second neighboring luma sample are symmetric with each other with respect to a position of the first neighboring luma sample. Stated another way, in some embodiments, neighboring luma samples 404X are selected from the candidate luma samples 404B in pairs, and each pair of neighboring luma samples 404X have symmetric positions with respect to the first luma sample 404C. In some situations, only one pair of neighboring luma sample 404X are selected and applied by the loop filter 424. In some situations, two or more pairs of neighboring luma sample 404X are selected and applied by the loop filter 424.

In some embodiments, the decoder 122 stores, in a line buffer, luma samples of an upper line located above the first luma sample 404C, a lower line located below the first luma sample 404C, two left columns located to the left of the first luma sample 404C, or two right columns located to the right of the first luma sample 404C, and uses the stored luma samples as candidate luma samples 404B from which the plurality of neighboring luma samples 404X applied by the loop filter 424 are selected.

In some embodiments, the video bitstream 116 further includes a fourth syntax element 428 representing an integer number M. A predefined luma region is centered at the first luma sample 404C. The predefined luma region is defined by an M-th upper line located above the first luma sample 404C, an M-th lower line located below the first luma sample 404C, an M-th left column located to the left of the first luma sample 404C, and an M-th right column located to the right of the first luma sample 404C, inclusively. The plurality of neighboring luma samples 404X are selected from a set of candidate luma samples 404B in the predefined luma region based on the second syntax element 422. In an example (FIG. 5A), the integer number M is equal to 2, and the predefined luma region 500 includes 5×5 luma samples.

FIGS. 5A-5F are diagrams illustrating an example luma region 500 that provides a set of candidate luma samples 404B according to candidate schemes 510, 520, 530, 540, 550, and 560, in accordance with some embodiments, respectively. The plurality of neighboring luma samples 404X applied by a loop filter 424 are selected from the set of candidate luma samples 404B located in a predefined luma region 500. Referring to FIGS. 5A-5F, in some implementations, the predefined luma region 500 is centered at the first luma sample 404C and defined by two upper lines 502U located above the first luma sample 404C, two lower lines 502L located below the first luma sample 404C, two left columns 504L located to the left of the first luma sample 404C, and two right columns 504R located to the right of the first luma sample 404C. The lines 502U and 502L intersect with the columns 504L and 504R at a set of cross sections, and the predefined luma region 500 include luma samples located at the set of cross sections. In various embodiments associated with FIGS. 5A-5F, the luma samples 404 labeled with numbers are the candidate luma samples 404B from which the plurality of neighboring luma samples 404X are selected to be used by the loop filter 424.

In some embodiments, the video bitstream 116 further includes a third syntax element 426 for defining a target candidate scheme (e.g., selected from a set of predefined candidate schemes 510, 520, 530, 540, 550, and 560). A set of candidate luma samples 404B are identified based on the target candidate scheme, and the plurality of neighboring luma samples 404X are further selected from the set of candidate luma samples 404 based on the second syntax element 426. In some embodiments, the third syntax element 426 is signaled in one of: a sequence header, a picture header, a subpicture header, a slice header, a tile header, and a superblock header.

In some embodiments, a distinct loop filter not shown is applied based on a subset of candidate luma samples located in the predefined luma region 500. Stated another way, the loop filter 424 and the distinct loop filter share the predefined luma region 500 from which luma samples 404 are selected based on the same or distinct filter shapes. The luma region 500 may only need to be loaded into a buffer once to support operations of two loop filters. For instance, the loop filter 424 associated with the CCSO mode is aligned with a constrained directional enhancement filter (CDEF) configured to implement a deblocking operation on the first luma sample 404C based on the predefined luma region 500 that is centered at the first luma sample 404C. By these means, memory space is saved for a buffer (e.g., line buffers, online buffer (cache for sample-based processing)).

Further, in some embodiments, in each candidate scheme 510, 520, 530, 540, 550, or 560 the set of candidate luma samples 404B are grouped in pair to provide a plurality of candidate luma sample pairs, in each of which two luma samples are labeled with the same integer number. Each candidate luma sample pair includes a first neighboring luma sample located at a first sample position and a second neighboring luma sample located at a second sample position, and the first sample position and the second sample position are symmetric with each other with respect to a position of the first luma sample 404C. For example, referring to FIG. 5A, a candidate luma sample pair labeled with "9" includes a first neighboring luma sample 506-1 located at a first sample position and a second neighboring luma sample 506-2 located at a second sample position, and the first sample position and the second sample position are symmetric with each other with respect to a position of the first luma sample 404C.

Figure 5A:
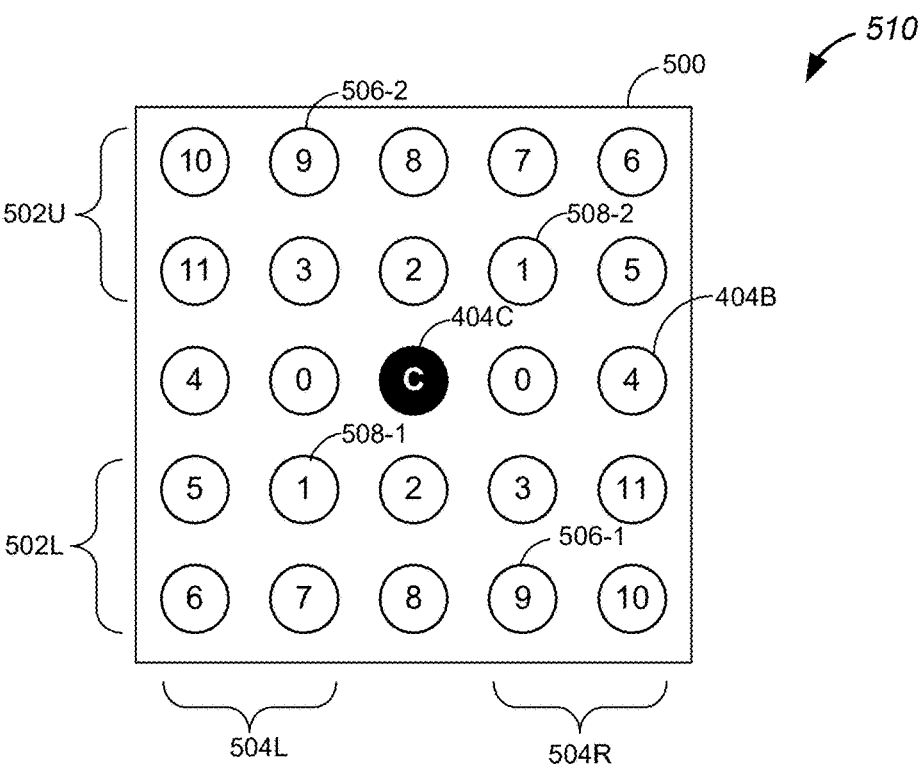
FIGS. 5A-5F are diagrams illustrating an example luma region that provides a set of candidate luma samples according to six different candidate schemes, in accordance with some embodiments.

Referring to FIG. 5A, in some embodiments, the set of candidate luma samples 404B include all 24 distinct neighboring luma samples in the predefined luma region 500, and are grouped to 12 distinct candidate luma sample pairs. The 12 distinct candidate luma samples pairs are labelled from "0" to "11." Alternatively, in some embodiments (e.g., FIGS. 5B-5F), the set of candidate luma samples 404B include less than 24 neighboring luma samples 404 included in the predefined luma region 500, and are grouped to a first number N of predefined candidate luma sample pairs located at predefined sample locations, where the first number N is less than 12. The candidate luma samples pairs are labelled from "0" to N−1 (e.g., "5" in FIGS. 5B-5D, "7" in FIGS. 5E and 5F).

Further, in some embodiments, the second index element 422 (FIG. 4) identifies one of the plurality of candidate luma sample pairs as the plurality of neighboring luma samples 404X applied to generate the first sample offset 406 of the first color sample by the loop filter 424. For example, if the second index element 422 has a decimal value of 1, two luma samples 508-1 and 508-2 are selected in each of FIGS. 5A-5F. The same value of the second index element 422 may identify different neighboring luma samples 404X in the different candidate schemes 510, 520, 530, 540, 550, and 560.

In some embodiments, based on the number of predefined candidate luma sample pairs each candidate scheme includes, the second syntax element 422 may have different number of bits. The second syntax element 422 may include a fixed number (e.g., 2, 3, 4) of binary bits. For example, the candidate scheme 510 requires that the second syntax element 422 include 4 binary bits to identify 12 candidate luma sample pairs. In another example, the candidate schemes 520, 530, 540, 550, and 560 require that the second syntax element 422 include at least 3 binary bits (e.g., 3 or 4) to identify 6 or 8 candidate luma sample pairs. In yet another example not shown, a candidate scheme includes 3 or 4 candidate luma sample pairs, and the second syntax element 422 include at least 2 binary bits to identify the candidate luma sample pairs. In yet another example not shown, a candidate scheme includes 1 or 2 candidate luma sample pairs, and the second syntax element 422 include a single binary bit to identify the candidate luma sample pairs.

In some embodiments, the second syntax element 422 includes a variable length codeword (e.g., a truncated unary code). For example, for the candidate scheme 510, the second syntax element 422 include 1-4 binary bits to identify the 12 candidate luma sample pairs, and any high bit that is equal to "0" is truncated. In an example, the second syntax element 422 is "0101," and coded as "101" in the video bitstream 116.

Figure 5B:
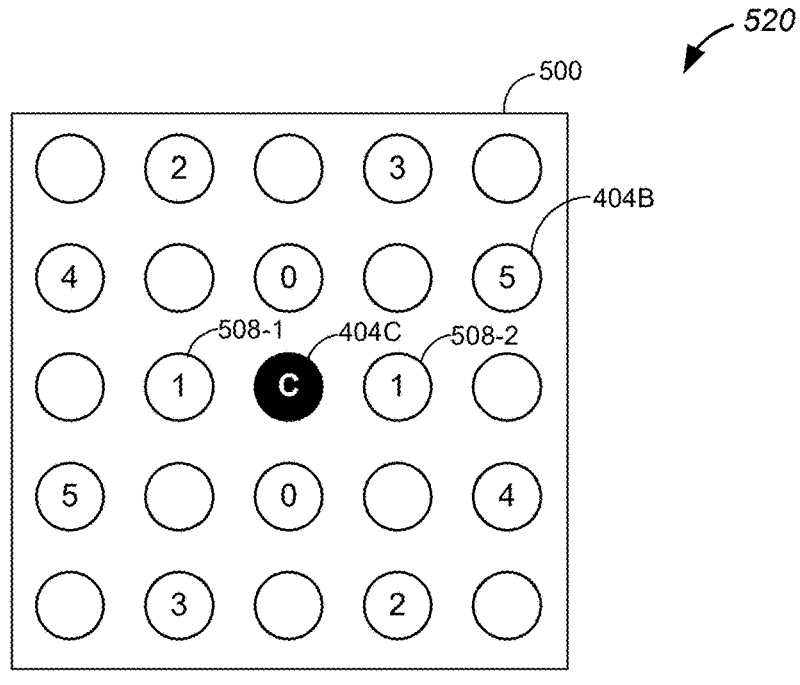
Figure 5C:
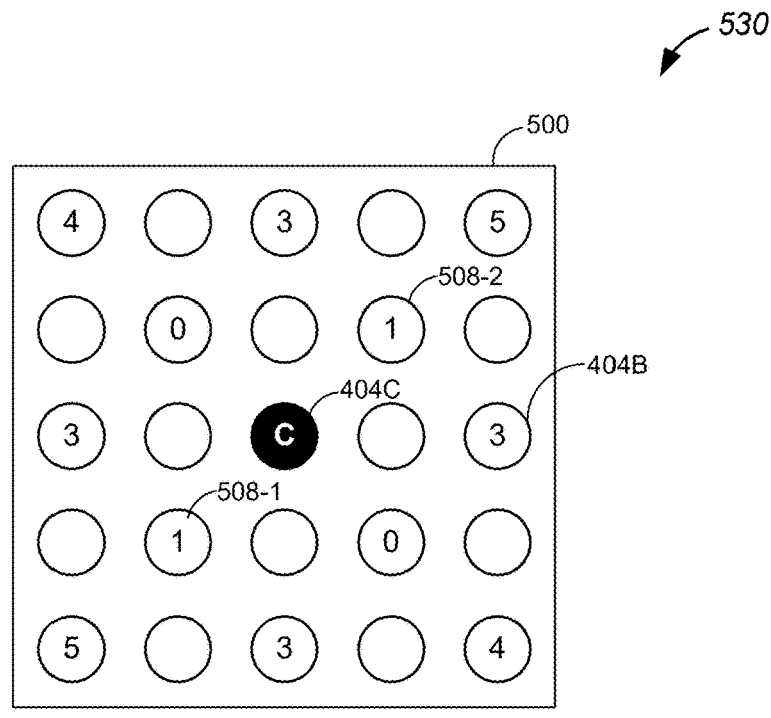

Referring to FIGS. 5B and 5C, in some embodiments, the set of candidate luma samples 404B include 12 distinct neighboring luma samples (e.g., grouped to 6 pairs), and no two candidate luma samples are immediately adjacent to each other on respective lines 502U and 502L and respective columns 504L and 504R. In each line or column, the luma samples 404B of the candidate scheme 520 and the luma samples 404B of the candidate scheme 530 interleave with one another. The second syntax element 422 identifies entirely different neighboring luma samples 404X in the candidate schemes 520 and 530.

Figure 5D:
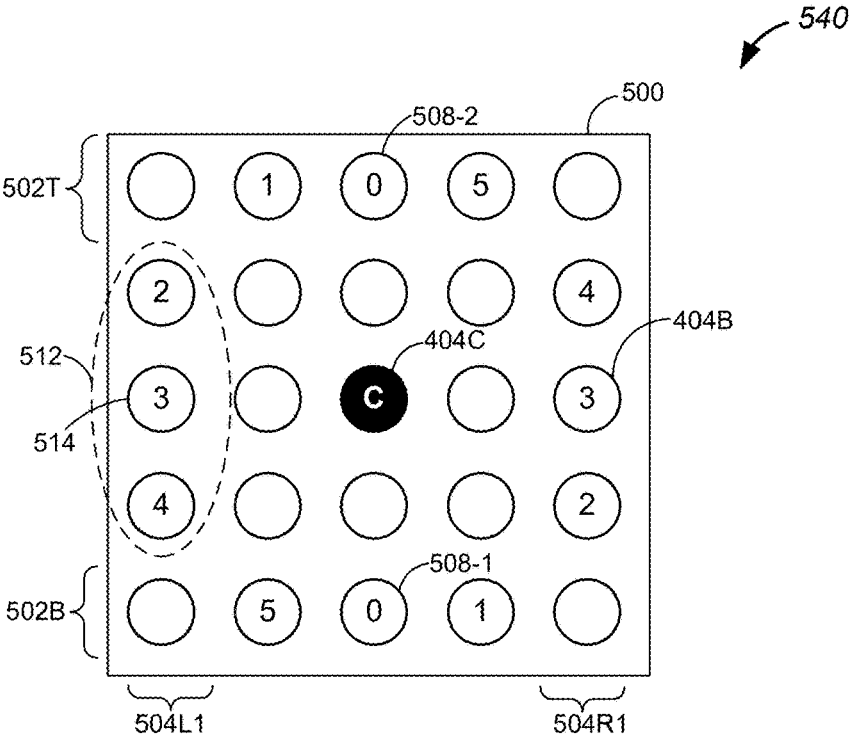

Referring to FIG. 5D, in some embodiments, the plurality of neighboring luma samples 404X applied by the loop filter 424 are selected from the set of candidate luma samples 404B as labeled by the integer numbers. The set of candidate luma samples 404B includes at least 3 successive luma samples (e.g., samples 512) in each of a top line 502T that is located two lines above the first luma sample 404C, a bottom line 502B that is located two lines below the first luma sample 404C, a left column 502L1 that is located two columns to the left of the first luma sample 404C, and a right column 504R1 that is located two columns to the right of the first luma sample 404C. A center luma sample of the 3 successive luma samples is located on the same line or column of the first luma sample 404C. For example, the 3 successive luma samples 512 are located on the left column 502L1, and include a center luma sample 514 (e.g., labelled with "3") that is aligned with the first luma sample 404C on the same line.

Figure 5E:
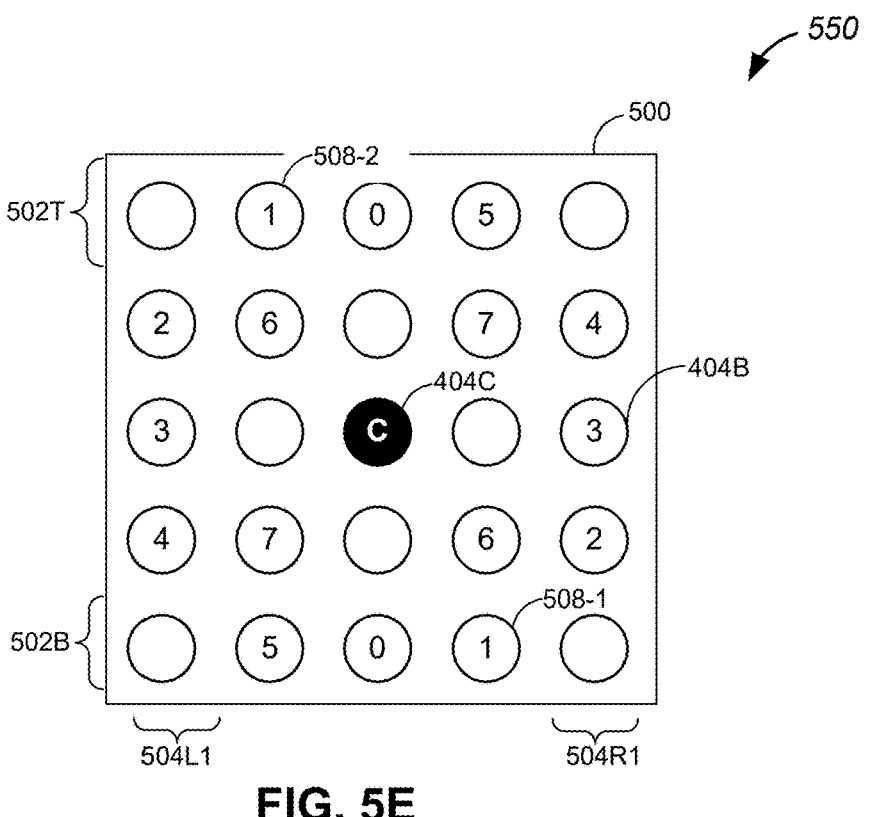

Referring to FIG. 5E, in some embodiments, in addition to the 3 successive luma samples on the lines 502B and 502T and the columns 504R1 and 504L1, the set of candidate luma samples 404B further includes four diagonal luma samples, e.g., labeled with "6" or "7," and each diagonal luma sample is located on a respective cross section of a line immediately adjacent to the first luma sample 404C and a column immediately adjacent to the first luma sample 404C.

Figure 5F:
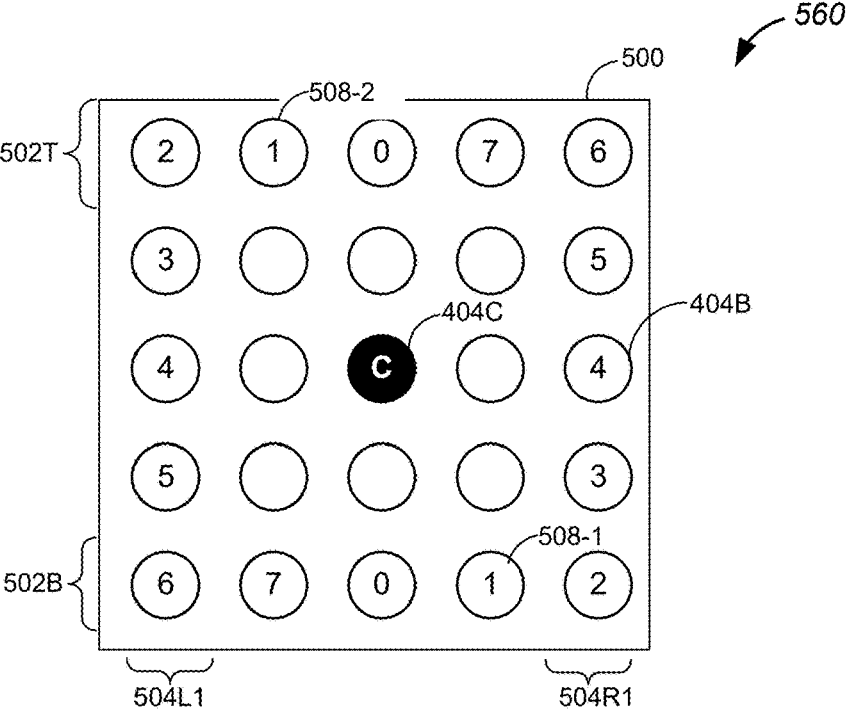

Referring to FIG. 5F, in some embodiments, the top line 502T and the bottom line 502B intersect with the left column 504L1 and the right column 504R1 to form four cross sections. In addition to the 3 successive luma samples on the lines 502B and 502T and the columns 504R1 and 504L1, the set of candidate luma samples 404B further includes four diagonal luma samples located at the four cross sections. The eight candidate luma sample pairs are labelled from "0" to "7," which correspond to decimal values of binary representations associated with the second syntax element 422.

Figure 6:
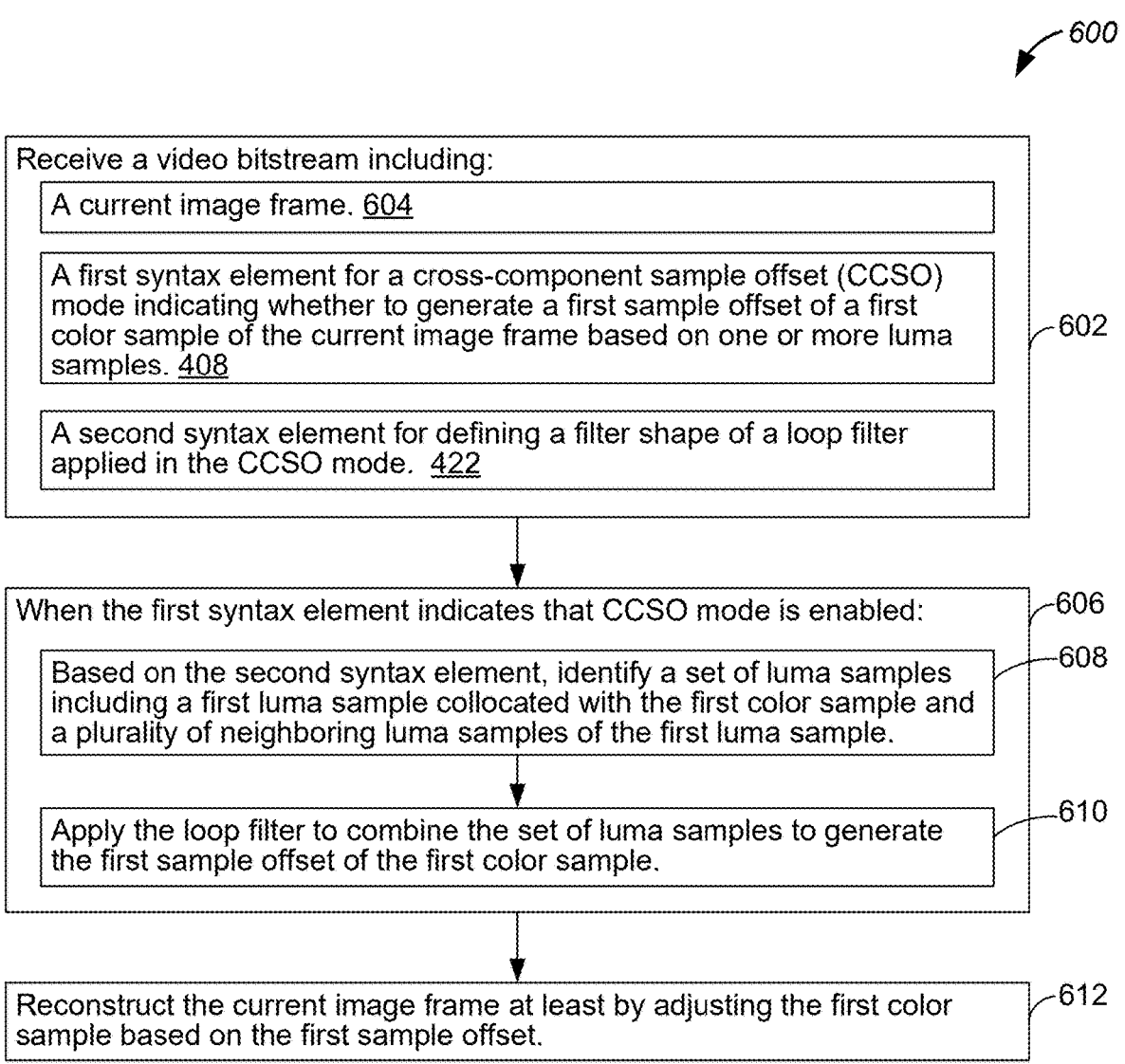
FIG. 6 is a flow diagram illustrating a method of coding video, in accordance with some embodiments.

FIG. 6 is a flow diagram illustrating an example method 700 of coding video, in accordance with some embodiments. The method 700 may be performed at a computing system (e.g., the server system 112, the source device 102, or the electronic device 120 in FIG. 1) having control circuitry and memory storing instructions for execution by the control circuitry. In some embodiments, the method 700 is applied jointly with one or more video codecs, including but not limited to, H.264, H.265/HEVC, H.266/VVC, AV1 and AVS/AVS2/AVS3. A cross-component offset filtering method is implemented based on an edge preserving loop filter that uses reconstructed samples (e.g., luma samples 404) to determine sample offsets 406 of luma samples 404 or chroma samples 402. The luma samples 404 may be classified based on band offsets (e.g., depending on luma samples 404) or edge offset (e.g., depending on gradient or difference values between a first luma sample 404C and neighboring luma samples 404X). Luma samples 404 located in positions defined by a filter shape are used to compute the sample offset 406 of a color sample (e.g., a first luma samples 404C or a first chroma sample 402C). In some implementations of this application, the filter shape is selected from a plurality of predefined candidates corresponding to a respective set of neighboring luma samples 404X, and a separate syntax element may be signaled in the video bitstream 116 (FIG. 1) to selecting the filter shape from the plurality of predefined candidates. By these means, when the selected filter shape is applied, a size of a buffer (e.g., an inline buffer) applied during video decoding is controlled, so is a latency for accessing the buffer in the worst case, thereby enhancing overall performance of the video decoder 122.

In some embodiments, the reconstructed samples from one or multiple color components (e.g., the luma samples 404) are used to classify the samples (e.g., the chroma samples 402) and derive the first sample offset 406. Examples of the neighboring luma samples 404X used in loop filtering are two symmetric neighboring luma samples 404X of the first luma sample 404C. To access the same number of samples as other in a loop filter in the same stage with cross component sample offset filter 424, the samples from upper two lines 502U, lower two lines 502L, left two columns 504L, and right two columns 502R of the first luma sample 404C are used. All or a subset of luma samples 404 in a predefined luma region 500 are used as neighboring luma samples 404X applied by the loop filter 424.

In some embodiments (FIG. 5A), the "C" denotes the first luma sample 404C, the symmetric neighboring luma samples 404X from 0 to 11 are used to derive the first sample offset 406, in this case in total 12 different filters are used, which is signaled using 3 bits (or variable length codeword, e.g., truncated unary code) at the high-level syntax.

In some embodiments (FIG. 5B), the "C" denotes the first luma sample 404C, the symmetric neighboring luma samples 404X from 0 to 5 are used to derive the first sample offset 406. Samples that are not marked will not be used in the classification, in this case in total 6 different filters are used, which is signaled using 2 (or 3) bits (or variable length codeword, e.g., truncated unary code) at the high-level syntax.

In some embodiments (FIG. 5C), the "C" denotes the first luma sample 404C, the symmetric neighboring luma samples 404X from 0 to 5 are used to derive the first sample offset 406. Samples that are not marked will not be used in the classification, in this case in total 6 different filters are used, which is signaled using 2 (or 3) bits (or variable length codeword, e.g., truncated unary code) at the high-level syntax.

In some embodiments (FIG. 5D), the "C" denotes the first luma sample 404C, the symmetric neighboring luma samples 404X from 0 to 5 are used to derive the first sample offset 406. Samples that are not marked will not be used in the classification. In this case in total 6 different filters are used, which is signaled using 2 or 3 bits (or variable length codeword, e.g., truncated unary code) at the high-level syntax.

In some embodiments (FIG. 5E), the "C" denotes the first luma sample 404C, the symmetric neighboring luma samples 404X from 0 to 7 are used to derive the first sample offset 406. Samples that are not marked will not be used in the classification. In this case in total 8 different filters are used, which is signaled using 3 bits at the high-level syntax.

In some embodiments (FIG. 5F), the "C" denotes the first luma sample 404C. A luma sample pair of the symmetric neighboring luma samples 404X from "0" to "7" are used to derive the first sample offset 406. The unmarked samples will not be used in the classification. In this case in total 8 different filter shapes are available, and the second syntax element 422 is signaled using 3 bits at the high-level syntax to select one of the total 8 different filter shapes.

In some embodiments, left two columns 504L (FIG. 5A), right two columns 504R (FIG. 5A), top one line 502T (FIG. 5E), and bottom one line 502B (FIG. 5E) are used to further reduce line buffer.

In some embodiments, multiple filter shapes are used, and switchable for individual frames or individual color component, the selection between those filters can be from embodiment one. In an example, either the filter shapes defined in FIG. 5A or the filter shapes defined in FIG. 5B can be used, and the selection is signaled at the high-level syntax. In some embodiments, the switch of different groups of filter shapes may be implicitly derived based on any information that is known to both encoder and decoder. In some embodiments, one flag (e.g., a fourth syntax element 428) may be signaled into the high level syntax to specify how many (e.g., the integer number M) neighboring columns/rows can be used as the filters. In an example, if the flag specifies that only the samples from adjacent one above and bottom rows, one left and right columns 504L1 and 504R1 can be used as filters, then only filter shape 0 to 3 in FIG. 5A can be used. Otherwise, if the flag specifies that only the samples from adjacent two above and bottom lines 502U and 502L, two left and right columns 504L and 504R can be used as filters, then all the filter shapes in FIG. 5A can be selected.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 600 is implemented for decoding video data. The method 700 includes receiving (operation 602) a video bitstream including a current image frame 604, a first syntax element 408 (FIG. 4) for a CCSO mode indicating whether to generate a first sample offset of a first color sample of the current image frame based on one or more luma samples, and a second syntax element 422 (FIG. 4) for defining a filter shape of a loop filter applied in the CCSO mode; when the first syntax element indicates (operation 606) that CCSO mode is enabled: based on the second syntax element, identifying (operation 608) a set of luma samples including a first luma sample collocated with the first color sample and a plurality of neighboring luma samples of the first luma sample; and applying (operation 610) the loop filter to combine the set of luma samples to generate the first sample offset of the first color sample; and reconstructing (operation 612) the current image frame at least by adjusting the first color sample based on the first sample offset.

(A2) In some implementations of A1, the plurality of neighboring luma samples are selected from a set of candidate luma samples, and the set of candidate luma samples includes 3 successive luma samples in each of: a top line that is located two lines above the first luma sample; a bottom line that is located two lines below the first luma sample; a left column that is located two columns to the left of the first luma sample; and a right column that is located two columns to the right of the first luma sample. A center luma sample of the 3 successive luma samples is located on the same line or column of the first luma sample.

(A3) In some implementations of A2, the set of candidate luma samples further includes four diagonal luma samples, and each diagonal luma sample is located on a respective cross section of a line immediately adjacent to the first luma sample and a column immediately adjacent to the first luma sample.

(A4) In some implementations of A2 or A3, the top line and the bottom line intersect with the left column and the right column to form four cross sections, and the set of candidate luma samples further includes four diagonal luma samples located at the four cross sections.

(A5) In some implementations of A1, the plurality of neighboring luma samples are selected from a set of candidate luma samples located in a predefined luma region, and the predefined luma region is centered at the first luma sample and is defined by two upper lines located above the first luma sample, two lower lines located below the first luma sample, two left columns located to the left of the first luma sample, and two right columns located to the right of the first luma sample.

(A6) In some implementations of A5, the set of candidate luma samples include 12 distinct neighboring luma samples, and no two candidate luma samples are immediately adjacent to each other on respective lines and respective columns.

(A7) In some implementations of A5 or A6, the loop filter includes a first loop filter. The method 600 further comprises: applying a second distinct loop filter based on a subset of candidate luma samples located in the predefined luma region.

(A8) In some implementations of any of A1-A7, the plurality of neighboring luma samples are selected from a set of candidate luma samples, and the set of candidate luma samples are grouped in pair to provide a plurality of candidate luma sample pairs. Each candidate luma sample pair includes a first neighboring luma sample located at a first sample position and a second neighboring luma sample located at a second sample position, and the first sample position and the second sample position are symmetric with each other with respect to a position of the first luma sample.

(A9) In some implementations of A8, the set of candidate luma sample pairs include 12 distinct candidate luma sample pairs.

(A10) In some implementations of A8, the set of candidate luma sample pairs include a first number of predefined candidate luma sample pairs located at predefined sample locations, and the first number is less than 12.

(A11) In some implementations of A8, based on the second syntax element, one of the plurality of candidate luma sample pairs is identified as the plurality of neighboring luma samples.

(A12) In some implementations of any of A1-A11, the second syntax element includes a fixed number of bits, the fixed number equal to 2, 3, or 4 bits.

(A13) In some implementations of any of A1-A11, the second syntax element includes a variable length codeword.

(A14) In some implementations of any of A1-A13, the second syntax element is signaled in one of: a sequence header, a picture header, a subpicture header, a slice header, a tile header, and a superblock header.

(A15) In some implementations of any of A1-A14, the method 600 further comprises selecting the plurality of neighboring luma samples from a set of candidate luma samples, wherein: the plurality of neighboring luma samples includes a subset of first neighboring luma samples and a subset of second neighboring luma samples; each first neighboring luma sample is uniquely associated with a respective second neighboring luma sample; and for each first neighboring luma sample, a respective position of the first neighboring luma sample and a respective position of the respective second neighboring luma sample are symmetric with each other with respect to a position of the first neighboring luma sample.

(A16) In some implementations of any of A1-A15, the method 600 further comprises: storing, in a line buffer, luma samples of an upper line located above the first luma sample, a lower line located below the first luma sample, two left columns located to the left of the first luma sample, or two right columns located to the right of the first luma sample; where the plurality of neighboring luma samples are selected from the stored luma samples.

(A17) In some implementations of any of A1-A16, the video bitstream further includes a third syntax element for defining a target candidate scheme. The method 600 further comprises identifying a set of candidate luma samples based on the target candidate scheme, where the plurality of neighboring luma samples are selected from the set of candidate luma samples based on the second syntax element.

(A18) In some implementations of any of A1-A16, the method 600 further comprises: identifying a set of candidate luma samples based on a common parameter of an encoder and a decoder, the plurality of neighboring luma samples are selected from the set of candidate luma samples based on the second syntax element.

(A19) In some implementations of any of A1-A18, the video bitstream further includes a fourth syntax element representing an integer number M. The method 600 further comprises: identifying a predefined luma region that is centered at the first luma sample and defined by an M-th upper line located above the first luma sample, an M-th lower line located below the first luma sample, an M-th left column located to the left of the first luma sample, and an M-th right column located to the right of the first luma sample; wherein the plurality of neighboring luma samples are selected from a set of candidate luma samples in the predefined luma region based on the second syntax element.

(A20) In some implementations of any of A1-A19, applying the loop filter to combine the set of luma samples to generate the first sample offset of the first color sample further comprises: generating one or more quantized values based on the set of luma samples; and classifying the first color sample based on the one or more quantized values to determine the first sample offset of the first color sample.

(A21) In some implementations of A20, the CCSO mode corresponds to an edge offset classifier. Applying the loop filter to combine the set of luma samples further comprises: based on the filter shape of the loop filter, identifying one or more neighboring luma samples of the first luma sample; and determining one or more difference values between the one or more neighboring luma samples and the first luma sample; wherein the one or more quantized values are generated based on the one or more difference values, and applied by the edge offset classifier to classify the first color sample.

(A22) In some implementations of any of A1-A21, the first color sample is one of the first luma sample, a first blue-difference chroma (Cb) sample, and a first red-difference chroma (Cr) sample, and each of the first Cb sample and the first Cr sample is collocated with the first luma sample.

(A23) In some implementations, a method is implemented for video encoding. The method includes receiving video data comprising a current image frame; encoding the current image frame; transmitting the encoded current image frame via a video bitstream; signaling, via the video bitstream, a first syntax element for a CCSO mode indicating whether to generate a first sample offset of a first color sample of the current image frame based on one or more luma samples; and signaling, via the video bitstream, a second syntax element for defining a filter shape of a loop filter applied in the CCSO mode. When the first syntax element indicates that CCSO mode is enabled, the second syntax element is applied to identify a first luma sample collocated with the first color sample and a plurality of neighboring luma samples of the first luma sample for determining a first sample offset of a first color sample.

(A24) In some implementations, a method is implemented for bitstream conversion. The method includes obtaining a source video sequence including a current image frame; and performing a conversion between the source video sequence and a video bitstream, the video bitstream comprises: the current image frame; a first syntax element for a CCSO mode indicating whether to generate a first sample offset of a first color sample of the current image frame based on one or more luma samples; a second syntax element for defining a filter shape of a loop filter applied in the CCSO mode. When the first syntax element indicates that CCSO mode is enabled, the second syntax element is applied to identify a first luma sample collocated with the first color sample and a plurality of neighboring luma samples of the first luma sample for determining a first sample offset of a first color sample.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A24 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A24 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current image frame, a first syntax element for a cross-component sample offset (CCSO) mode indicating whether to generate a first sample offset of a first color sample of the current image frame based on one or more luma samples, and a second syntax element for defining a filter shape of a loop filter applied in the CCSO mode;
when the first syntax element indicates that CCSO mode is enabled:
based on the second syntax element, identifying a set of luma samples including a first luma sample collocated with the first color sample and a plurality of neighboring luma samples of the first luma sample; and
applying the loop filter to combine the set of luma samples to generate the first sample offset of the first color sample; and
reconstructing the current image frame at least by adjusting the first color sample based on the first sample offset.

2. The method of claim 1, wherein the plurality of neighboring luma samples are selected from a set of candidate luma samples, and the set of candidate luma samples includes 3 successive luma samples in each of:
a top line that is located two lines above the first luma sample;
a bottom line that is located two lines below the first luma sample;
a left column that is located two columns to the left of the first luma sample; and
a right column that is located two columns to the right of the first luma sample;
wherein a center luma sample of the 3 successive luma samples is located on the same line or column of the first luma sample.

3. The method of claim 2, wherein the set of candidate luma samples further includes four diagonal luma samples, and each diagonal luma sample is located on a respective cross section of a line immediately adjacent to the first luma sample and a column immediately adjacent to the first luma sample.

4. The method of claim 2, wherein the top line and the bottom line intersect with the left column and the right column to form four cross sections, and the set of candidate luma samples further includes four diagonal luma samples located at the four cross sections.

5. The method of claim 1, wherein the plurality of neighboring luma samples are selected from a set of candidate luma samples located in a predefined luma region, and the predefined luma region is centered at the first luma sample and is defined by two upper lines located above the first luma sample, two lower lines located below the first luma sample, two left columns located to the left of the first luma sample, and two right columns located to the right of the first luma sample.

6. The method of claim 5, wherein the set of candidate luma samples include 12 distinct neighboring luma samples, and no two candidate luma samples are immediately adjacent to each other on respective lines and respective columns.

7. The method of claim 5, wherein the loop filter includes a first loop filter, the method further comprising:
applying a second distinct loop filter based on a subset of candidate luma samples located in the predefined luma region.

8. The method of claim 1, wherein the plurality of neighboring luma samples are selected from a set of candidate luma samples, and the set of candidate luma samples are grouped in pair to provide a plurality of candidate luma sample pairs, and each candidate luma sample pair includes a first neighboring luma sample located at a first sample position and a second neighboring luma sample located at a second sample position, and the first sample position and the second sample position are symmetric with each other with respect to a position of the first luma sample.

9. The method of claim 8, wherein the set of candidate luma sample pairs include 12 distinct candidate luma sample pairs.

10. The method of claim 8, wherein the set of candidate luma sample pairs include a first number of predefined candidate luma sample pairs located at predefined sample locations, and the first number is less than 12.

11. The method of claim 8, wherein based on the second syntax element, one of the plurality of candidate luma sample pairs is identified as the plurality of neighboring luma samples.

12. The method of claim 1, wherein the second syntax element includes a fixed number of bits, the fixed number equal to 2, 3, or 4 bits.

13. The method of claim 1, wherein the second syntax element includes a variable length codeword.

14. The method of any of claim 1, wherein the second syntax element is signaled in one of: a sequence header, a picture header, a subpicture header, a slice header, a tile header, and a superblock header.

15. The method of claim 1, further comprising selecting the plurality of neighboring luma samples from a set of candidate luma samples, wherein:
the plurality of neighboring luma samples includes a subset of first neighboring luma samples and a subset of second neighboring luma samples;
each first neighboring luma sample is uniquely associated with a respective second neighboring luma sample; and
for each first neighboring luma sample, a respective position of the first neighboring luma sample and a respective position of the respective second neighboring luma sample are symmetric with each other with respect to a position of the first neighboring luma sample.

16. The method of claim 1, further comprising:
storing, in a line buffer, luma samples of an upper line located above the first luma sample, a lower line located below the first luma sample, two left columns located to the left of the first luma sample, or two right columns located to the right of the first luma sample;

wherein the plurality of neighboring luma samples are selected from the luma samples that are stored in the line buffer.

17. The method of claim 1, wherein the video bitstream further includes a third syntax element for defining a target candidate scheme, further comprising:

identifying a set of candidate luma samples based on the target candidate scheme, wherein the plurality of neighboring luma samples are selected from the set of candidate luma samples based on the second syntax element.

18. The method of claim 1, further comprising:

identifying a set of candidate luma samples based on a common parameter of an encoder and a decoder, wherein the plurality of neighboring luma samples are selected from the set of candidate luma samples based on the second syntax element.

19. The method of claim 1, wherein the video bitstream further includes a fourth syntax element representing an integer number M, further comprising:

identifying a predefined luma region that is centered at the first luma sample and defined by an M-th upper line located above the first luma sample, an M-th lower line located below the first luma sample, an M-th left column located to the left of the first luma sample, and an M-th right column located to the right of the first luma sample;

wherein the plurality of neighboring luma samples are selected from a set of candidate luma samples in the predefined luma region based on the second syntax element.

20. The method of claim 1, wherein applying the loop filter to combine the set of luma samples to generate the first sample offset of the first color sample further comprises:

generating one or more quantized values based on the set of luma samples; and classifying the first color sample based on the one or more quantized values to determine the first sample offset of the first color sample.

21. The method of claim 20, wherein applying the loop filter to combine the set of luma samples further comprises, wherein the CCSO mode corresponds to an edge offset classifier:

based on the filter shape of the loop filter, identifying one or more neighboring luma samples of the first luma sample; and determining one or more difference values between the one or more neighboring luma samples and the first luma sample;

wherein the one or more quantized values are generated based on the one or more difference values, and applied by the edge offset classifier to classify the first color sample.

22. The method of claim 1, wherein the first color sample is one of the first luma sample, a first blue-difference chroma (Cb) sample, and a first red-difference chroma (Cr) sample, and each of the first Cb sample and the first Cr sample is collocated with the first luma sample.

23. A computing system, comprising:

control circuitry; and memory storing one or more programs configured to be executed by the control circuitry, the one or more programs further comprising instructions for:

receiving video data comprising a current image frame;

encoding the current image frame;

transmitting the encoded current image frame via a video bitstream;

signaling, via the video bitstream, a first syntax element for a CCSO mode indicating whether to generate a first sample offset of a first color sample of the current image frame based on one or more luma samples; and signaling, via the video bitstream, a second syntax element for defining a filter shape of a loop filter applied in the CCSO mode;

wherein when the first syntax element indicates that CCSO mode is enabled, the second syntax element is applied to identify a first luma sample collocated with the first color sample and a plurality of neighboring luma samples of the first luma sample for determining a first sample offset of a first color sample.

24. A non-transitory computer-readable storage medium storing one or more programs for execution by control circuitry of a computing system, the one or more programs comprising instructions for:

obtaining a source video sequence including a current image frame; and performing a conversion between the source video sequence and a video bitstream, wherein the video bitstream comprises:

the current image frame;

a first syntax element for a CCSO mode indicating whether to generate a first sample offset of a first color sample of the current image frame based on one or more luma samples;

a second syntax element for defining a filter shape of a loop filter applied in the CCSO mode;

wherein when the first syntax element indicates that CCSO mode is enabled, the second syntax element is applied to identify a first luma sample collocated with the first color sample and a plurality of neighboring luma samples of the first luma sample for determining a first sample offset of a first color sample.

* * * * *